United States Patent [19]
Vencel et al.

[11] Patent Number: 5,457,463
[45] Date of Patent: Oct. 10, 1995

[54] RADAR RETURN SIGNAL SIMULATOR

[75] Inventors: Leslie J. Vencel, Fulham Gardens; Jonathan J. Schutz, Para Vista; Rahmon C. Coupe, Glenalta; Martin J. Hoffensetz, Evandale; Scott J. Capon, Elizabeth Field; Ian G. Wrigley, Tea Tree Gully; George Hallwood, Athelstone, all of Australia

[73] Assignee: The Commonwealth of Australia, Australian Capital Territory, Australia

[21] Appl. No.: 157,067

[22] Filed: Jan. 21, 1994

[30] Foreign Application Priority Data

Jun. 5, 1991 [AU] Australia .................. PK6495

[51] Int. Cl.⁶ .................................................. G01S 7/40
[52] U.S. Cl. .................... 342/169; 342/170; 342/171
[58] Field of Search .................................. 342/169, 170, 342/171, 172

[56] References Cited

U.S. PATENT DOCUMENTS

| | | | |
|---|---|---|---|
| 3,982,244 | 9/1976 | Ward et al. | 342/169 |
| 4,168,502 | 9/1979 | Susie | 342/172 |
| 4,204,342 | 5/1980 | Linfield | 342/169 X |
| 4,591,858 | 5/1986 | Jacobson | 434/2 X |
| 4,656,480 | 4/1987 | Allezard et al. | 342/151 |
| 4,737,792 | 4/1988 | Grone | 342/169 |
| 4,944,679 | 7/1990 | Allen et al. | 434/2 |
| 4,959,015 | 9/1990 | Rasinski et al. | 434/2 |
| 5,117,231 | 5/1992 | Yaron | 342/195 |
| 5,138,325 | 8/1992 | Koury | 342/169 |
| 5,166,691 | 11/1992 | Chin et al. | 342/165 |
| 5,223,840 | 6/1993 | Cronyn | 342/170 |
| 5,300,934 | 4/1994 | Asbell et al. | 342/172 |
| 5,339,087 | 8/1994 | Minarik | 342/375 |

Primary Examiner—John B. Sotomayor
Attorney, Agent, or Firm—Brown, Martin, Haller & McClain

[57] ABSTRACT

An apparatus for generating one or more radar return signals representative of one or more remote objects useable in ground based, shipboard and airborne radar systems for testing the radar and its user. The apparatus may generate one or more return signal scenarios which may if required interact with the real or preprogrammed movement of the craft in which the radar is fitted. To ensure accurate and repeatable radar return signal generator apparatus operation, the radar's own built-in test signal output is used by the apparatus to calibrate the radio frequency portion of the apparatus, which adapts a remote object return signal scenario into the crafts radar device. To further improve the accuracy of the return signal, a digital first-in-first-out (FIFO) delay means is used to accurately allow the delayed reuse of the radar's own transmission signal.

6 Claims, 6 Drawing Sheets

RADAR RETURN SIGNAL SIMULATOR

This invention relates to electromagnetic environment generators and in particular to radar return signal generators. Both ground based, shipboard and airborne radar systems may incorporate the invention for, but not exclusively, the purpose of testing a radar system and its operator.

BACKGROUND OF THE INVENTION

The general art of simulating a radar return signal environment involves the generation of radar specific electromagnetic signals for the purpose of testing the radar system and training the user of the radar system, comprises a complex array of equipment and techniques.

Some equipment arrays are specific to the type of radar because of the unique manner in which the radar transmits its signals. For example, some radars emit periodic pulses of radio frequency energy, some random pulses and others radiate continuously. Their corresponding receivers are linked to the transmitters and only by synchronizing with the transmitter, are they able to discriminate from the many signals received, those which correspond to the signals transmitted and returned from surrounding objects in their field of view. Indeed, even amongst the above categories of radar types, for example, pulse type radars, emitters vary in respect to the width of the pulse, the pulse interval and pulse compression scheme. Some test equipment arrays even replicate the gain patterns of the radar's receiving antenna in an attempt to provide a realistic return signal simulation for testing and mimicing the return environment expected by an operational radar.

One such return signal simulation technique, is to provide a separate oscillator and signal information modulator, for each remote object to be simulated. Each of the signals when suitably modified to represent a return signal are combined and injected at RF to the antenna input of the radar. This approach requires a very large amount of electronic equipment so as to simulate a realistic quantity of remote objects. Each separate oscillator, modulator and their associated RF paths require highly accurate set up. Indeed, some prior return signal generators separately generate each return signal even to the point of using separate, albeit, highly stabilised oscillator circuits to provide long term stability. Regardless of the quality of the circuits and their undoubted expense, the equipment must be calibrated and regularly re-calibrated with, for example, expensive vector network analyser test equipment, operated by skilled calibration engineering staff. Only a high degree of maintenance ensures frequency and phase stability, repeatability and adequate performance during each radar return environment simulation scenario. Without such an approach when using this type of simulation technique, there is a high likelihood that the simulation created will not be representative of real or accurate return signals or the expected radar environment.

Additionally, this technique of return signal generation, although the most obvious to implement is not considered to be economical or maintainable within justifiable budget constraints, particularly if a realistic quantity and quality of remote objects are to be simulated for radar and pilot test purposes.

Another simulation technique is to provide a lesser quantity of separate RF oscillators, and time share them. By rapidly switching a variety of frequency changing and modulation circuits across one RF oscillator a multiple number of simulated remote object radar return signals can be made to appear to be simultaneously generated. These signals are injected at RF level to the radar in place of or combined with its antenna input. Apart from having the same stability problems of the previously described simulation technique, a further disadvantage is that the repetition rate of pulses required to provide a realistic simulation of multiple remote objects is high, which can result in a loss of simulation quality or integrity in dynamic simulation scenarios. This technique cannot simulate a continuous wave return signal nor produce two pulses from two simulated objects at the same time.

A third technique is to simulate signals suitable for insertion into the digital and video section of the radar receiver; however, this technique does not use the RF portion of the radar receiver and thereby tests only the display portion of the radar. Thus this technique restricts the degree of realistic control an operator has to manipulate the total radar system under test.

Apart from simulating a quantity of remote object return signals, the equipment array may also simulate the electromagnetic environment caused by other radar reflectors (RF clutter caused by ground and cloud return signals) and in the case of military aircraft, the use of deceptive and non-deceptive EW counter measure signals.

Various techniques exist for the generation of these types of simulated signals, most significantly it is important, like other simulation signals that these signals should be inserted in a manner that uses a majority of the radar's circuits and provides the most realistic electromagnetic environment in which to test not only the radar operator but also the radar equipment. Particularly in the case of a radar operating during an airborne exercise.

Associated with each simulation technique previously described is the need to control the delay period between a specific radar transmitter pulse and its corresponding return signal since the delay is a direct indication of the distance between the radar transmitter and the remote object returning the signal.

A variety of radar transmission modes can be used by modern pulsed and other radar equipment. For example, the transmitted pulses may be periodic but they may also be interrupted or the period between pulses can be varied (jittered) as part of the planned operation of the radar. In such circumstances the simulation apparatus must have a mechanism for ordering the delay period for each return signal and its corresponding transmitter pulse. This process is further complicated when the target range is ambiguous, i.e. before the target reflection due to one pulse has been received at the radar, the radar has transmitted one or more extra pulses. (This situation often occurs when the radar uses high or medium pulse repetition frequencies).

In the first instance, for purely periodic transmitter pulse generation it has been common practice to initiate a single counter per return signal generator, to count down the requisite target delay return period, and when the counter times out to initiate the generation of a return signal corresponding to a particular periodically occurring transmitter pulse. In the case where the range is ambiguous, the delay value loaded into the counter is the time between the most recently transmitted radar pulse and the arrival of the target return, rather than the delay corresponding to the time of travel of the pulse which actually caused that target return. This solution, is only useful for periodic modes of transmitter operation because of the way in which ambiguous ranges are handled. Radars which use a jittered mode of signal pulse transmission are not easily simulated at reasonable cost, or simplicity of design because of the highly variable nature of the transmit pulse timing, requiring in some techniques multiple counters per target simulation to handle ambiguous near and far field return signal ranges.

Therefore, it is not unusual for radar electromagnetic environment generators to be built at great expense, require constant maintenance, and present unwanted limitations to the quantity of targets used to simulate realistic test and training scenarios. More importantly, they are restricted in application to ground based test equipment because of the bulk and complexity of the equipment needed to provide realistic simulations.

Thus it can be seen that equipment stability, realistic target signals simulation and affordable quantities of target simulation circuits are amongst the problems of providing an acceptable radar electromagnetic environment generator apparatus.

BRIEF SUMMARY OF THE INVENTION

In its broadest form the invention comprises radar return signal generator apparatus for a radar comprising at least one target profile generator means, a respective target data and radar data processing means for receiving digital data from said radar representative of at least the mode and parametric information of said radar and said target profile generator means and generating a digital signal representative of the relative aximuth, elevation, range and velocity of a target, and a radio frequency interface means operating at an intermediate frequency of said radar for receiving a target data and radar data processing means signal and providing an analog phase coherent simulated radar return signal to said radar. In a further aspect of the invention said radar has a radar built-in test signal generation means, and said radar return signal generator apparatus further comprises a radar built in test operation detection means, a combiner means adapted to receive at a first input to said combiner means said target data and radar data processing means signal and at a second input said radar built in test signal output wherein an output of said combiner means is connected to said radio frequency interface means and upon detection of said radar built-in test signal by said detection means said combiner means provides a connection between its first input and its output so that said built-in test signal can be used to calibrate said radio frequency interface means.

In yet a further aspect of the invention said radar return signal generator apparatus further comprises a radar data detection means for receiving from said radar a plurality of digital signal pulses representative of a transmitted radar signal, a digital delay means to delay a plurality of said digital representations, wherein the output of said delay means is input to said radio frequency interface means which is adapted to generate a return signal representative of a target having a range relative to the said delay.

DETAILED DESCRIPTION OF THE INVENTION

Although the invention is applicable to a wide variety of radar systems operating in an equally wide number of modes, this embodiment will describe a radar return signal generator which is capable of simulating multiple objects in real time, in three dimensional space for all modes of pulsed doppler radars.

A further application specific requirement will designate that each remote object is at least of potential interest as a target of the operator of the radar system. This assumes a combat environment and accounts for the use of the term radar "target" generator throughout the following text. It will, however, be clearly apparent that simulated return signals could represent any number and type of objects, targets or otherwise.

Ground based apparatus according to this invention produce simulated but realistic radar return signals for insertion into a radio frequency input of the radar system, as well as electronic counter measure (ECM) and clutter signals.

In particular, ground based applications of this radar return signal generator include radar performance evaluation, radar software development, radar production testing, combat tactics development, and aircraft pilot performance and training assessment, but the invention is not limited to such applications.

Airborne apparatus provide for the superposition of simulated radar return signals onto existing real radar return signals using radio frequency coupling techniques so that testing and training is as realistic and safe as possible.

Applications resulting from the airborne use of radar return signal generators include real time radar performance testing, operational test and evaluation, pilot training and performance assessment, pilot combat training and performance assessment, combat aircraft manoeuvre and missile detection and evasion assessment, but the invention is not limited to such applications.

Figure 1:
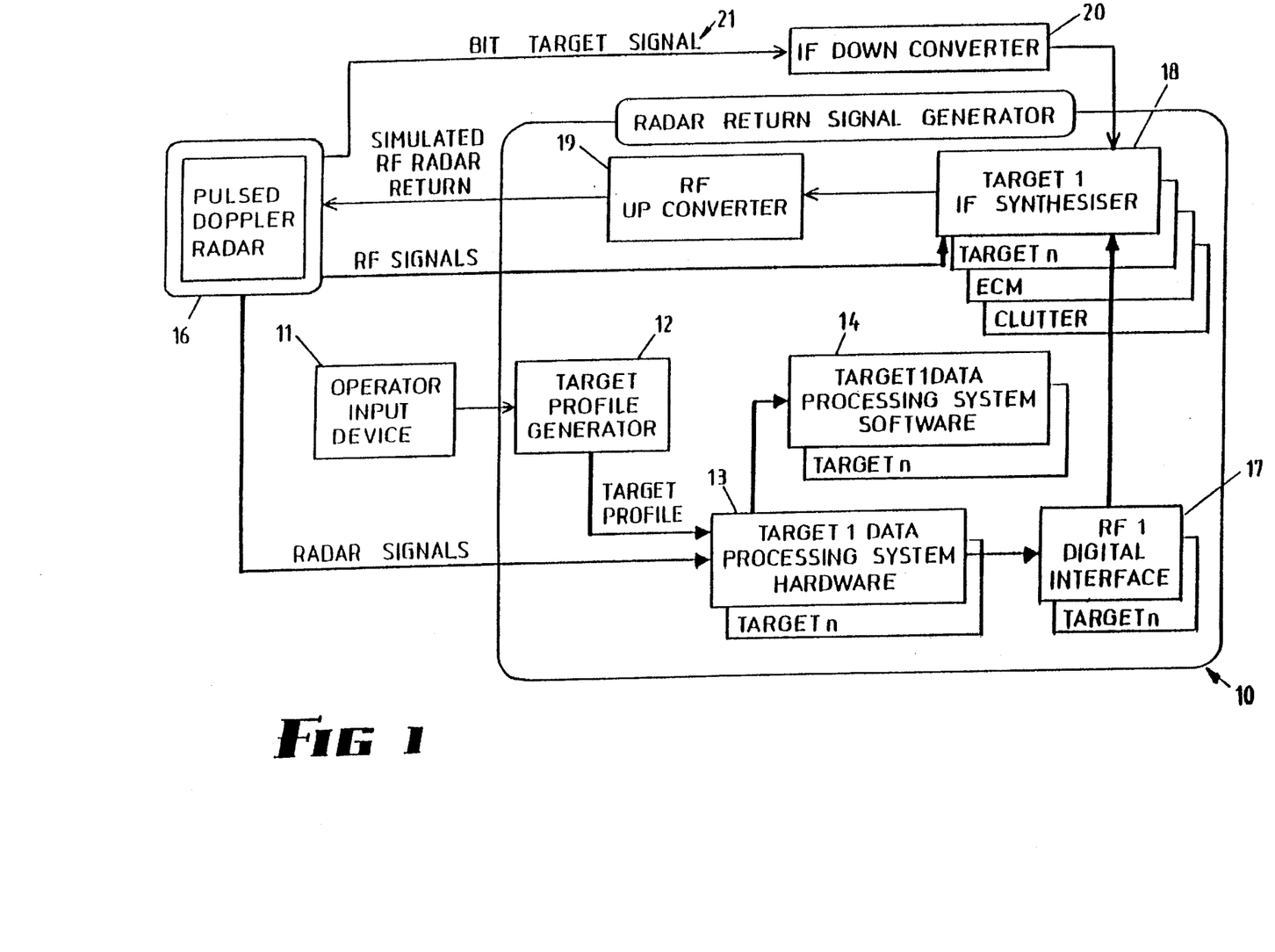
FIG. 1 depicts a functional block diagram of a radar return signal generator apparatus linked to a radar system.

FIG. 1 depicts some of the major functional blocks of a radar return signal generator apparatus 10 used to simulate multiple targets. In a ground based apparatus, an operator of the apparatus enters target data which fully describes the flight path of the aircraft on which the radar under test/ evaluation or being used for simulation, perceives it is travelling in, as well as a quantity of different targets via an operator input device 11. The input device may comprise a computer terminal, alternatively it may be a suitably programmed computer or computer controlled data storage device loading the required data. Target data is received by a target profile generator 12 which produces data representative of the following target parameters, relative target azimuth, relative target elevation, range, range rate, and target return signal level (based on target aspect, range and radar cross-section of target).

The output of the target profile generator 12 feeds into one or more target data processing system networks. The Target Data Processing System 15 is depicted schematically as hardware 13 and software 14 functional blocks.

In this embodiment a pulsed doppler radar 16 supplies mode, transmitter pulse timing and antenna position data to each target data processing system, and which also receive inertial navigation data obtained from the aircraft's own navigation equipment in an airborne application or the target profile generator 12 as in a ground based application. In a ground based apparatus, navigation data maybe simulated to mimic the flight path programmed by the user, alternatively information is obtained from the pilot simulation equipment being manipulated by the pilot under test so that greater realism can be achieved.

Each target data processing system calculates from the given position and aspect of the target, its relative position to the aircraft and from current radar status data, a set of target return signal parameters is generated for the next processing cycle of the radar. One of those parameters is the target return delay which is directly related to the range of the target from the aircraft radar. Other parameters include relative target location and aspect, represented by the following factors:

Main/sum channel attenuation, Guard channel attenuation, and a Guard azimuth difference channel attenuation, elevation difference channel attenuation, azimuth difference channel phase shift and elevation difference channel phase shift. Wherein, Guard, azimuth difference and/or elevation difference channels may or may not be required, depending on the configuration of the radar. These factors may define the characteristics of a realistic target return signal and at this stage of their processing are in a digital form for presentation to the RF Digital Interface device 16 which corresponds with each target data processing system.

The RF Digital Interface 17 provides various digital signals to corresponding Target IF Synthesizer devices 18, which, for each target, generates an IF carrier having an appropriate doppler shift. Each IF signal is, for the purpose of this embodiment, split into main/sum and guard/difference channels as depicted in more detail in FIG. 4. This arrangement is characteristic of most doppler pulsed radars. It is to those channels that the attenuation and phase shift factors are applied to produce a realistic target return signal having the appropriate range, target aspect and location characteristics.

In particular, the generated RF carriers are gated to replicate the appropriate radar transmitted pulse width and delayed relative to the radar's transmitted pulse in accord with the range of the simulated target and modulated according to the type of pulse compression technique in use.

In the ground based configuration the radar's transmitter is disabled for safety reasons.

Dependent upon whether the Target Synthesizer 18 is operating at IF as in this embodiment or at RF as may be the case in other embodiments an RF Up Converter 19 may be required to interface between the Target Synthesizer 18 and the Radar 16.

A further IF Down Converter 20 may also be required if the Target Synthesizer 18 operates at IF and is shown in FIG. adapting the Built In Test (BIT) Signal 21 output from the Radar 16.

To add to the realism of the radar return signal the signals for each target return may be combined with deceptive and non-deceptive Electronic Counter Measure (ECM) signals and clutter. The generation and combination of these signals may be performed by RF synthesizer devices at RF while the RF device may provide the combined return signal at either an Intermediate Frequency (IF) or at the transmit RF frequency of the radar. Alternatively the signal may be radiated directly into the antenna of the radar by a separate antenna. (In this latter case the simulated target may move in range, not angle).

The entry by the operator of aircraft flight paths and target details is the only process not repeated each processing cycle of the radar.

From an operational view point there are specific differences between the ground based radar return signal generator and the airborne version. For example, the pilot is a user rather than an operator and operational scenarios are preprogrammed and selected by the pilot or generated randomly by the radar return generator. Also, there is no need for a preprogrammed aircraft flight plan since real time navigational data is acquired from the aircraft's navigational equipment, making the actions of the pilot a interactive part of the target generation scenario. Indeed, the radar target generator can be programmed to react to the pilot/aircraft actions to produce a more realistic target response.

From a technical viewpoint an airborne version will have the capability to combine not only simulated return signals but real return signals plus all their attendant, ECM and clutter signals to not only increase the realism of the exercise but ensure that the pilot is not flying blind with regard to real threats or other aircraft.

Of course the radar's transmitter is not disabled in this arrangement.

Figure 2:
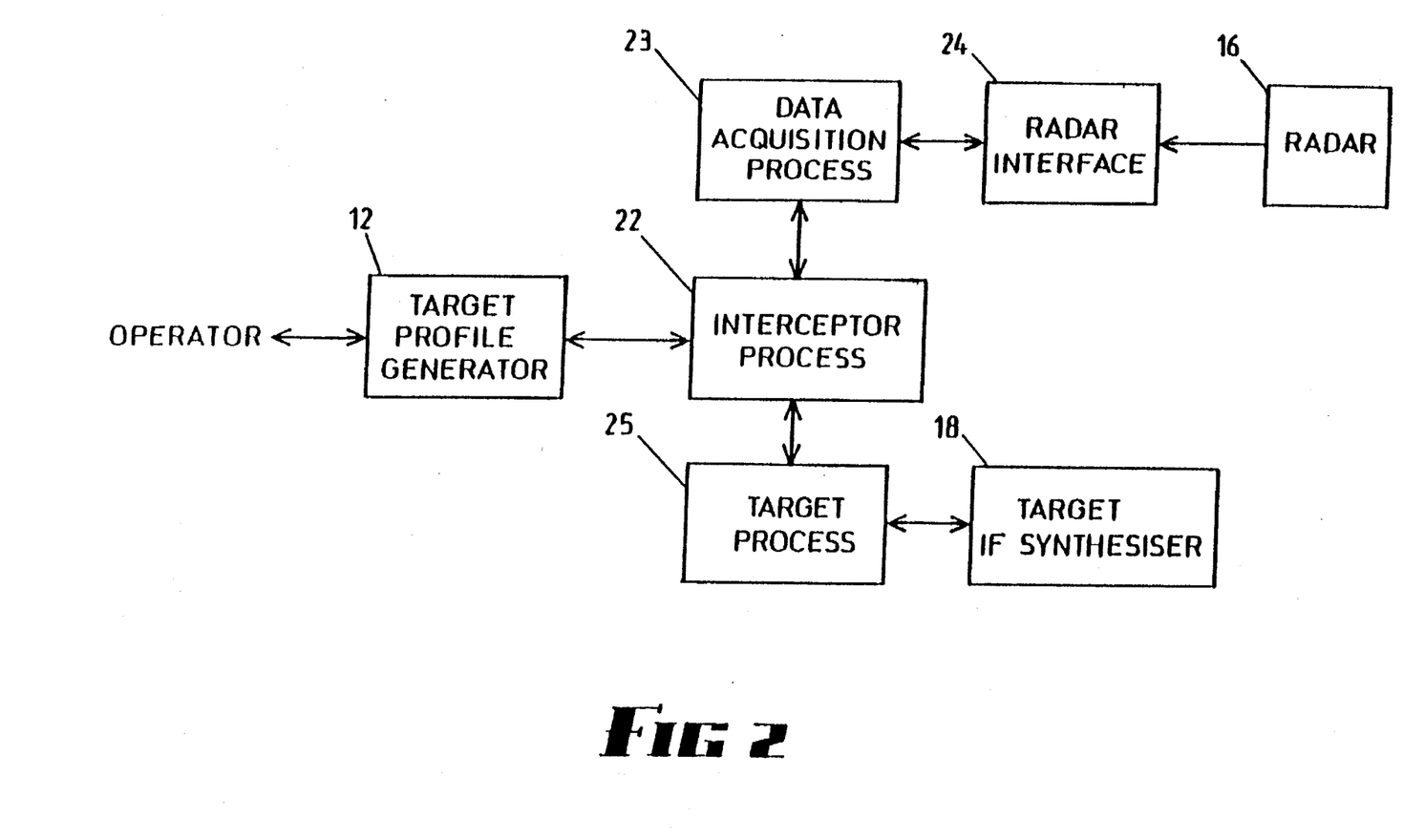
FIG. 2 depicts a detailed functional block diagram of the processes and process interfaces of a radar return signal generator apparatus.

FIG. 2 depicts a more detailed functional block diagram of the minimum configuration of a radar return signal generator. The main functional blocks of FIG. 1 are identified and similarly designated on FIG. 2. Of course the target profile generator signal could be produced in a like circuit located remotely of the radar, for example, by a computer device located at a control point or physically remote of the craft containing the radar.

The Target Profile Generator 22 is used as the operator interface for the Radar Return Signal Generator 10, having functions which allow the operator to input a target scenario, display the scenario details, arrange the scenario into a form suitable for real-time application and provide scenario storage and retrieval facilities. A possible embodiment of the Target Profile Generator is a personal computer or work station.

The interceptor process 1 which forms part of the previously described Target Data Processing System 15 routes data between the Target Profile Generator 12 and other processes performed by the apparatus such as Data Acquisition Processor 23 as well as calculating the "interceptor"

(or own-aircraft) motion in the example where the Radar Return Signal Generator is being used to exercise a radar designed for airborne use. A likely embodiment of the Interceptor Processor is a single. transputer, although it may also share the capacity of an adjacent or otherwise virtually linked transputer located elsewhere in the apparatus.

The Data Acquisition Processor 23 acquires radar status information from the Radar 16 via an appropriate Radar Interface Circuit 24 and transfers the information at least on a periodic basis to the Interceptor Processor 22 for distribution to other related processors. A likely implementation of the Data Acquisition Processor is a process or processes running on one or more transputers forming part of the apparatus.

The Target Processor 25 uses own-aircraft motion data distributed to it by the Interceptor Processor 22, target scenario data provided by the Target Profile Generator 12 and radar status data supplied regularly by the Data Acquisition Processor 23 to calculate target synthesis parameters as required by the Target IF Synthesizer 18 device which in turn generates a radar return signal at either IF or RF. A likely implementation of the Target Processor 25 is a single transputer.

Figure 3:
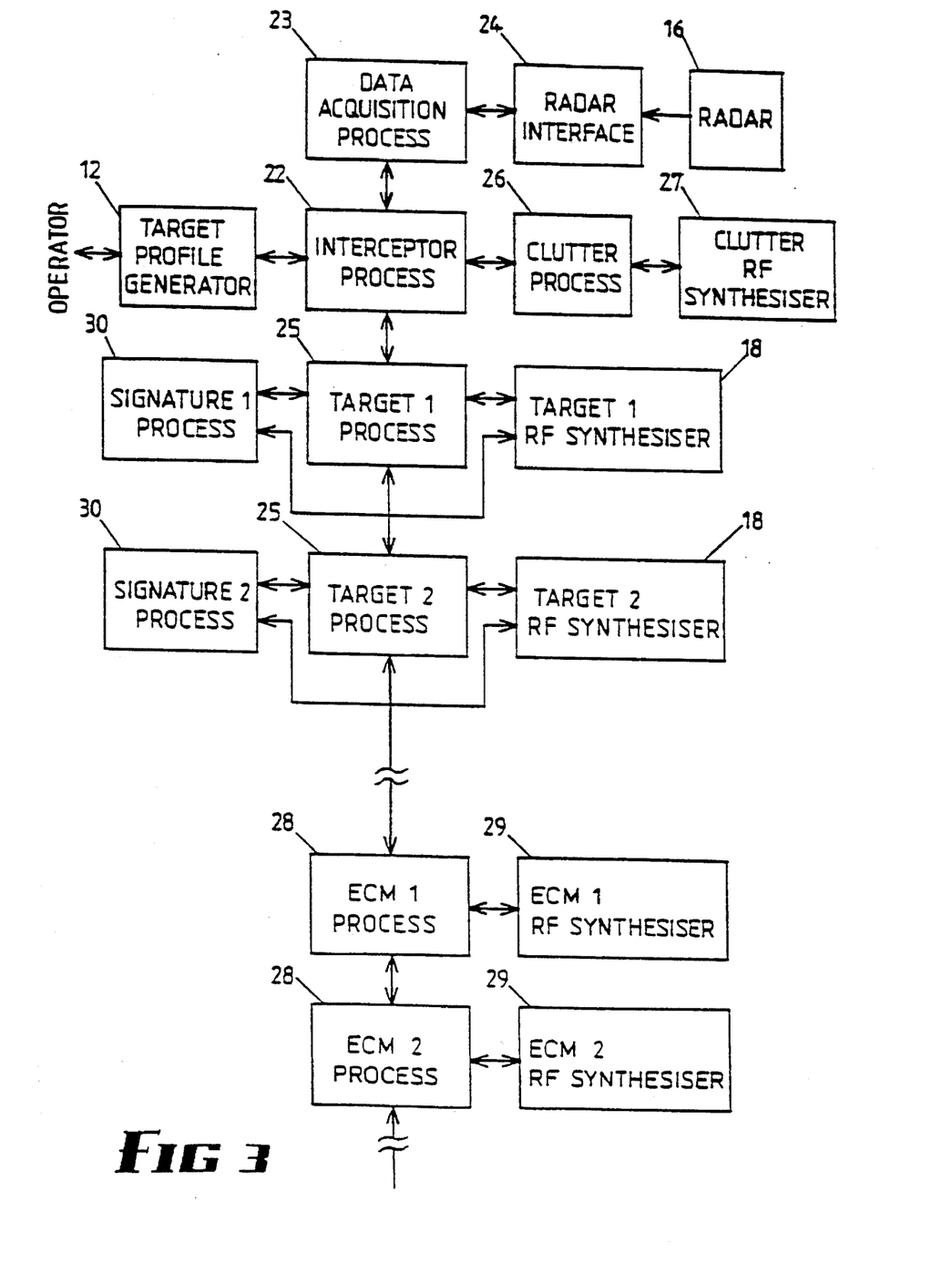
FIG. 3 depicts a detailed functional block diagram of the processes and process interfaces of an embodiment of a radar return signal generator apparatus.

FIG. 2 depicts the minimum radar return signal generation processes to generate one unique target (or a number of targets which do not exist at the same bearing, by time-division multiplexing). FIG. 3 depicts an embodiment of a radar return signal generator having multiple target generating capabilities as shown by the multiple Target Processors 25 and their associated RF Synthesizers as well as providing features such as Electronic Counter Measure (ECM) signal inputs and clutter scenarios.

The Clutter Processor 26 uses own-aircraft motion data from the Interceptor Processor 22, clutter scenario data derived from additional information input to the Target Profile Generator 12 and radar status data derived from the Data Acquisition Processor 23 to calculate clutter synthesis parameters as required by the Clutter RF Synthesizer Circuit 27 to generate a radar clutter return signal which is combined into the radar return signal path.

As described for the Target Processor 25 an ECM processor 28 may be adapted to take up the same virtual location as the Target Processor and mimic the same functions however it will contain the means to generate Electronic Counter Measure signals. Likewise the ECM RF Synthesizers 29 are used like the Target RF Synthesizers 18 to generate and combine the ECM processor output signals into the radar return signal path.

Furthermore, the Target Signature Processors 30 add functionality to each of the Target Processors 25 by using target signature scenario data derived from the Target Profile Generator 12, radar status data derived from the Data Acquisition Processor 23, to calculate the parameters required by the Target RF Synthesizers 18 to generate such characteristics as jet engine modulation, glint and scintillation. It is likely that each Target Signature Processor/Process will be implemented as code in the same transputer as the Target Processor or alternatively it could be implemented as a process on a separate or virtually linked/associated transputer within the apparatus.

The processing, calculation and intercommunications functions of the radar target generator for each individual target may be as described performed by transputer devices. Transputers have common interconnection hardware, protocol and language and this is a particularly useful characteristic, in this embodiment, since the quantity of targets can be increased simply by replicating the described transputer configuration which may be by code replication or simple addition of more transputer devices.

However, other computer devices may be suitably configured and programmed to perform equivalent functions and there are, of course, a number of configurations and specific signal processing circuits which will achieve similar results.

Figure 4:
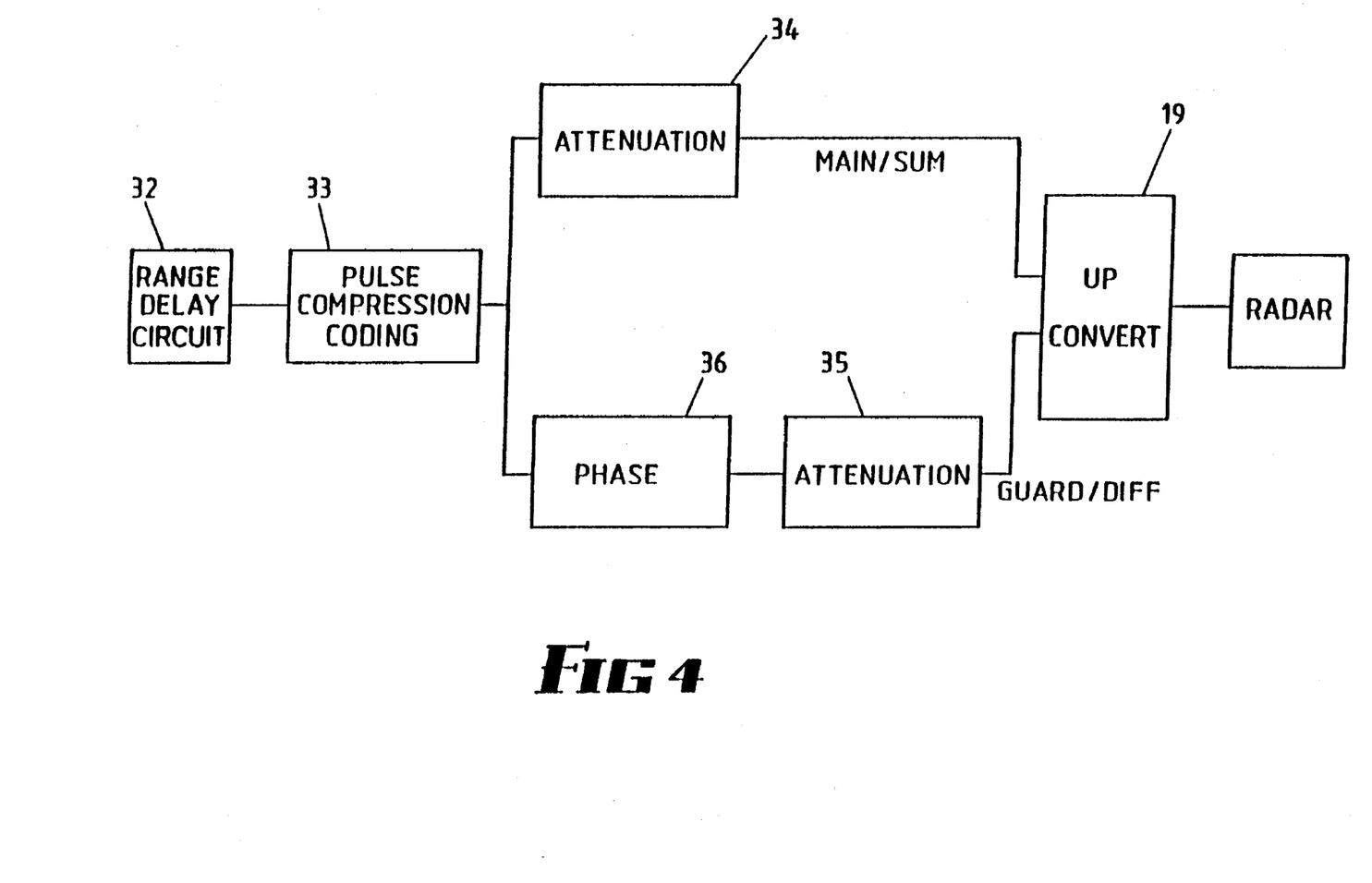
FIG. 4 depicts an embodiment of a target intermediate frequency synthesizer up-converter and radar.

FIG. 4 depicts, in functional block form, the process of creating a target return signal in the Target RF Synthesizer 18 as described previously. Firstly a frequency generator is used to produce a doppler shifted signal representative of the shift produced by an object reflecting the transmitted signal frequency the required parameter being supplied by the corresponding Target Processor 25. A moving target profile is produced by varying the doppler shift. A mathematical calculation is performed and the radio frequency circuits manipulated in the doppler block 31 to produce the appropriate doppler shifted radio frequencies (sum, azimuth difference, elevation difference and guard channels). It will be appreciated that the doppler block is simply a frequency generator but is referred to as such in the context of this particular embodiment.

To ensure the delay period between a specific radar transmitter pulse and its corresponding return signal a radar pulse train delay circuit referred to as a FIFO is used to accurately synchronise the return signal with the transmitted signal and thus mimic accurate distance and jittered signal characteristics. The detailed operation of the FIFO 32 will be described later in the specification. Additional pulse compression coding 33 as required for the type of radar being used is decoded or encoded as required.

Relative target location and aspect are encoded onto the two channels shown by changing the attenuation 34 of the sum channel and the attenuation 35 and phase 36 of the difference channel (also referred to as previously noted as the main/sum channel and the guard/difference channel, in which guard, azimuth difference and elevation difference signals are time multiplexed).

The previously described functions are in one arrangement performed at IF, consequently, an Up Converter 19 is required to transform those frequencies to the appropriate frequency band of the radar. As described previously, it is also possible for attenuation and phase manipulation to be performed at the radars operational frequency, thus negating the need for an Up Converter 22.

The functions performed in the functional blocks depicted in FIG. 4 utilize circuits of high stability which may also perform in the airborne versions of the invention in otherwise environmentally harsh conditions, Such conditions exist at times on the ground as well as in airborne equipment and are prone to induced drift of component characteristics, which may result in a change to the attenuation, phase and frequency characteristics of the simulated target return signal. Prior art ground based and airborne configurations rely heavily on the stability of these particular circuits, and require frequent re-calibration to ensure the integrity of the apparatus and utility of the equipment during the test and practice sessions.

A Built-In Test facility, is normally used by a pulsed doppler radar for its own calibration requirements, to provide stability and reliability for its own calibration needs, however, it has been found that this facility can also be successfully used by the radar return signal generator apparatus of this invention.

The radars' Built-In Test (BIT) target signal is a complicated signal generated by the radar itself using its own oscillator network and radio frequency generator circuits. The signal is unique to the radar and is generated to represent a target at zero range reflecting a perfect return signal. Predetermined sum/main channel and guard/difference channel characteristics are injected into the RF input of the radar, at a location near the antenna receiving ports, which the radar uses to self calibrate its receiver characteristics and adjust parameters when necessary.

The BIT target signal is automatically generated and the radar automatically ceases other operators while the self-calibration process is conducted. In this invention this automatic function is not changed. As depicted schematically in FIG. 5, the BIT target signal is tapped off the radar without affecting its level or characteristics and directed to a Down Converter 20 and then to a signal combiner device 37 having two inputs. The first input of the combiner device is the output signal of the doppler block 31, the second input is that obtained from the BIT target signal output of the radar. The output of the combiner device is the input to the Target Synthesizer 18 as depicted in FIGS. 1, 2 and 3.

Figure 5:
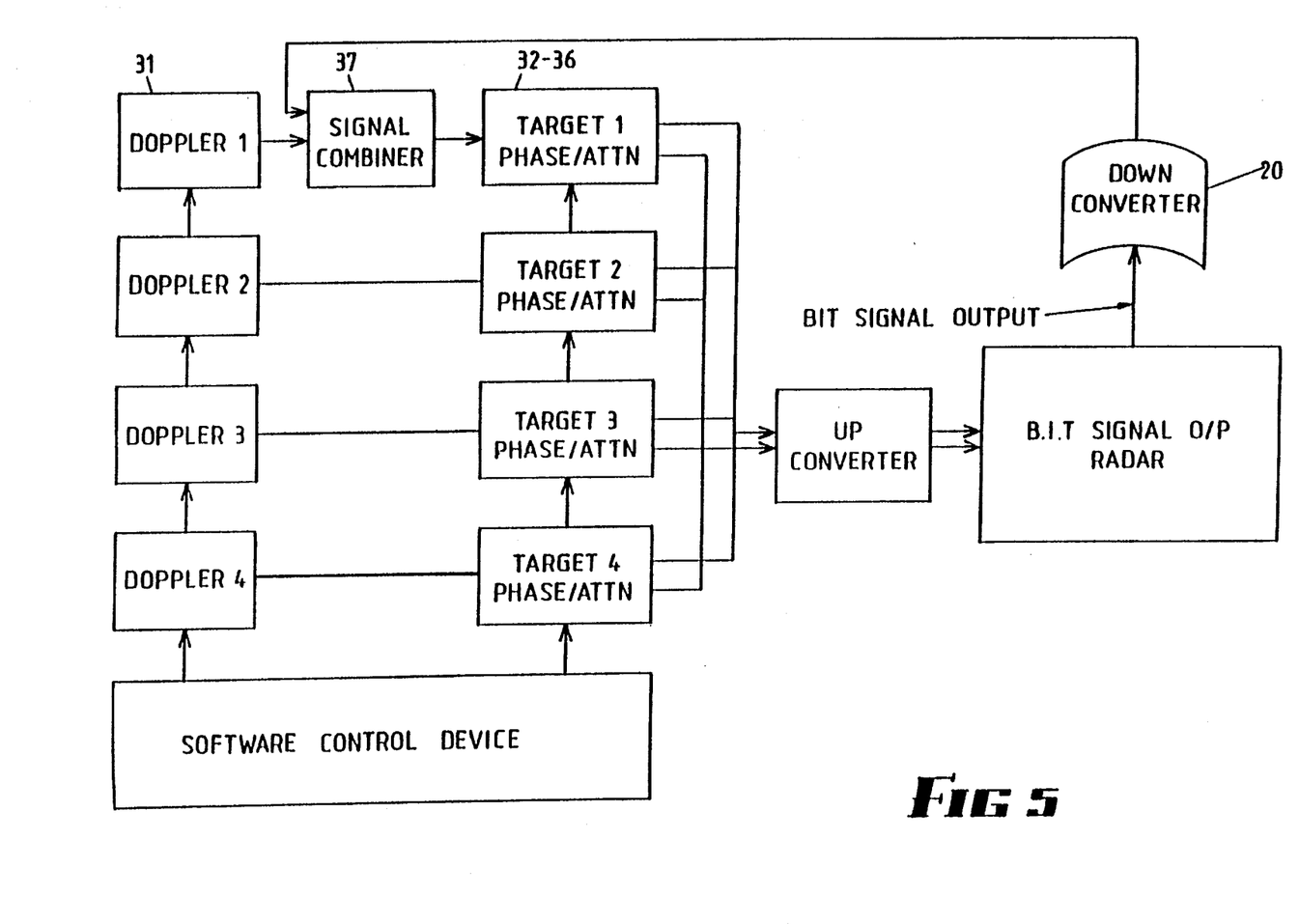
FIG. 5 depicts an embodiment of the configuration required to .use the built-in test signal from a radar system in the calibration of a return signal generator apparatus.

Obviously, the doppler generator 31 and the Target Synthesizer device 18 are under software control of the Target Data Processing System 13/14 and the Target Profile Generator 12 which are able to monitor the radars operation and detect the initialization of a BIT target signal self-calibration process. When this occurs, the doppler generator 31 is disabled and the combiner device 37 as shown in FIG. 5, conducts the incoming BIT return signal between its second input and its output and thereby directs the BIT target signal through the return signal generator Radio Frequency interface circuits, where values for attenuation and phase change in the sum/main and guard/difference channels correspond to those caused by the radars antenna when the BIT target is used in the normal configuration.

The BIT target signal needs only to be combined with one of the target generation signals, since the high frequency path, in which the phase sensitivity and highest signal loss, is common to all targets occurs after combination of the target signals at the input to the up-converter. The signal path being unique for each target (prior to combination in the up-conveter) involves a relatively low frequency of operation and therefore phase sensitivity and signal losses are low, enabling good matching between target signals to be realised without the need for regular adjustment or recalibrataion of the relevant and most sensistive portions of the radar return signal generator.

The radars own calibration standard is thus used in the frequency sensitive circuits of the return target signal generator and concordance of simulated target characteristics with the signals expected by the radar is assured. Importantly, the phase angle characteristics of the guard/difference channels relative to the sum channel are properly matched, thereby ensuring accurate replication of a realistic return signal environment.

It is to be noted that the 2 channel device depicted in FIG. 4 could be a multichannel device depending on the number of multiplexed channels and beams.

Since this BIT return signal self-test procedure occurs at times and for durations designated to ensure optimum operation of the radar it can be concluded that the target return signal generator is also adequately tested and calibrated to match the requirements of the overall system.

Also, incorporated into this invention is a means by which the problem of replicating the delay period between specific radar transmitter pulse and its corresponding return signal.

Figures 6A, 6B:
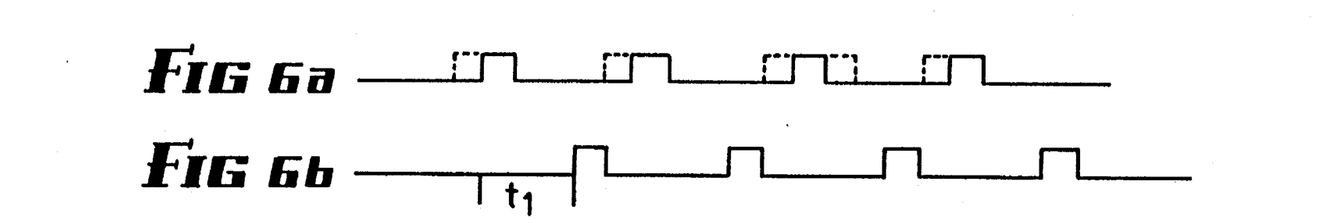
FIG. 6a depicts a standard and jittered digital radar transmit pulse train.
FIG. 6b depicts a digital target return delay signal for a near target (non-filtered pulse train) with no range ambiguity.

FIG. 6a depicts (continuous line) a pulse train representative of the periodic occurrence of a radar transmission pulse having a pulse repetition period of $t_0$.

FIG. 6b depicts a pulse train representative of a near field return signal, with the return delay $t_1$ being shorter than the period between transmitter pulses $t_0$.

Figure 6C:
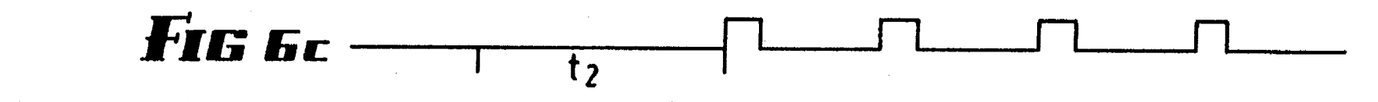
FIG. 6c depicts a digital target return delay signal for a far target (non-filtered pulse train) with no range ambiguity.

FIG. 6c depicts a pulse train representative of far field return signal with a return delay $t_2$ being longer than the period between transmitter pulses $t_0$.

Figure 6D:
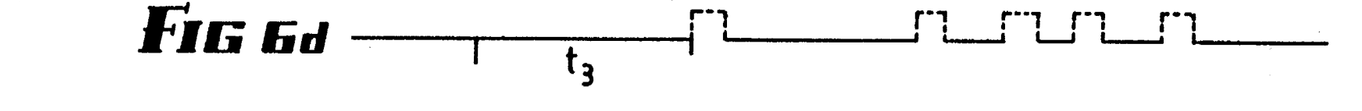
FIG. 6d depicts a digital target return delay signal for a far target resulting from a jittered transmitter pulse train.

FIG. 6a also depicts (broken line) a jittered radar transmit pulse train while FIG. 6d depicts a pulse train of a jittered return signal with a return delay $t_3$ being longer than the period between transmitter pluses $t_0$.

Unless the first returned signal pulse is monitored exactly, the concordance of the return signal pulses with their initiating transmitter pulse is soon lost even though the period between pulses is substantially constant.

A further complication arises when the transmitter pulses are jittered as part of the mode of the radar's operation, and the period between pulses becomes variable and return pulses shift along the time axis in concordance with the transmitted pulses but according to a delay period representative of the range of the target from the radar.

Figure 7A:
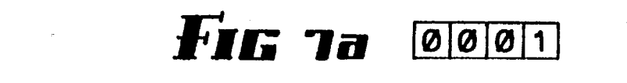
FIG. 7a depicts an embodiment of a digital target return delay circuit for a near field return.
Figure 7B:
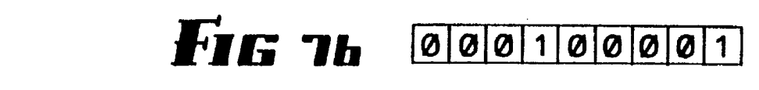
FIG. 7b depicts an embodiment of a digital target return delay circuit for a far field return.
Figure 7C:
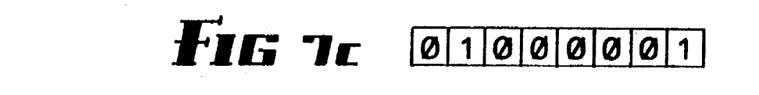
FIG. 7c depicts an embodiment of a digital target return delay circuit for a far field return of a jittered radar transmit train.

The invention provides for this problem of return pulse discrimination by providing a storage means in which a digital pulse train representative of transmission pulses from the radar is stored and from which the pulse train is not extracted until the required target/range delay has elapsed. In one embodiment this device is a digital delayline comprising a FIFO (first in first out) counter device as depicted schematically in FIGS. 7a, 7b and 7c each arranged with the requisite length for each of the delay periods $t_1$, $t_2$ and $t_3$ as used in FIG. 6.

Thus no matter what the period between transmitter pulses is, the digital delay line preserves them for the requisite delay period. Obviously, for variable delay periods a variable digital delay is used.

The digital output is then used to control the timing of each return signal, thereby preserving transmit to received return pulse concordance, so that additional processing, such as pulse compression and the application of the requisite attenuations and phase shifts can be performed to produce an acceptable return signal for each target.

It follows also that although circuits for generating ECM and clutter are separate topics, the invention provides by its modular design a simple mode for adding these circuits into the apparatus. Additionally, because of the use of the BIT target signal calibration techniques, and the target return delay line, the quality of the ECM and clutter signals is much improved over conventional circuits and represent a more accurate simulation of a real ECM and clutter.

The claims defining the invention are as follows:

1. A radar return signal generator apparatus for a radar comprising:

at least one target profile generator means, a respective target data and radar data processing means for receiving digital data from said radar representative of at least the mode and parametric information of said radar and said target profile generator means and generating a digital signal representative of the relative azimuth, elevation, range and velocity of a target, and a radio frequency interface means operating at an intermediate frequency of said radar for receiving a target data and radar data processing means signal and providing an analog phase coherent simulated radar return signal to said radar.

2. A radar return signal generator apparatus according to claim 1 wherein said radar has a radar built-in test signal generation means, and said radar return signal generator apparatus further comprises:

a radar built-in test operation detection means, a combiner means adapted to receive at a first input to said combiner means said target data and radar data processing means signal and at a second input said radar built-in test signal output wherein an output of said combiner means is connected to said radio frequency interface means and upon detection of said radar built-in test signal by said detection means said combiner means provides a connection between its first input and its output so that said built-in test signal can be used to calibrate said radio frequency interface means.

3. A radar return signal generator apparatus according to claim 1 further comprises a radar data detection means for receiving from said radar a plurality of digital signal pulses representative of a transmitted radar signal, a digital delay means to delay a plurality of said digital representations, wherein the output of said delay means is input to said radio frequency interface means which is adapted to generate a return signal representative of a target having a range relative to the said delay.

4. A radar return signal generator apparatus according to claim 1 wherein said radio frequency interface means has a plurality of channels.

5. A radar return signal generator apparatus according to claim 4 wherein said channels comprise a main/sum and guard/difference channels.

6. A radar return signal generator apparatus according to claim 1 wherein said target data and radar data processing means is a transputer devices.

* * * * *